United States Patent
Foss (10) Patent No.: US 9,194,151 B2
(45) Date of Patent: Nov. 24, 2015

(54) TRANSITION ELEMENT FOR CONNECTING A TOWER TO A JACKET

(71) Applicant: OWEC Tower AS, Bergen (NO)

(72) Inventor: Gunnar Foss, Den Haag (NL)

(73) Assignee: Owec Tower As, Bergen (NO)

( * ) Notice: Subject to any disclaimer, the term of this patent is extended or adjusted under 35 U.S.C. 154(b) by 0 days.

(21) Appl. No.: 14/084,905

(22) Filed: Nov. 20, 2013

(65) Prior Publication Data

US 2014/0075864 A1 Mar. 20, 2014

(51) Int. Cl.
| | |
|---|---|
| *E04H 12/00* | (2006.01) |
| *F03D 11/04* | (2006.01) |
| *E02B 17/00* | (2006.01) |
| *E02B 17/02* | (2006.01) |
| *E02D 27/42* | (2006.01) |
| *E04H 12/10* | (2006.01) |
| *E04C 3/04* | (2006.01) |

(52) U.S. Cl.
CPC ............ *E04H 12/00* (2013.01); *E02B 17/0004* (2013.01); *E02B 17/027* (2013.01); *E02D 27/425* (2013.01); *E04H 12/10* (2013.01); *F03D 11/04* (2013.01); *F03D 11/045* (2013.01); *E02B 2017/0091* (2013.01); *E04C 2003/0491* (2013.01); *E04C 2003/0495* (2013.01); *E04H 2012/006* (2013.01); *F05B 2240/912* (2013.01); *F05B 2240/913* (2013.01); *F05B 2240/9121* (2013.01); *Y02E 10/728* (2013.01)

(58) Field of Classification Search
CPC ..................... F05B 2240/913; F05B 2240/912; F05B 2240/3121; F05B 2240/9121; E04H 2012/006; E04H 12/00; E04H 12/22; E04H 12/10; F03D 11/045

USPC ................ 52/651.01, 651.07, 651.08, 651.09
See application file for complete search history.

(56) References Cited

U.S. PATENT DOCUMENTS

| | | | | |
|---|---|---|---|---|
| 546,710 | A * | 9/1895 | Rogers | 74/103 |
| 2,098,343 | A * | 11/1937 | Lawton | 52/292 |
| 4,403,916 | A * | 9/1983 | Skelskey | 416/14 |
| 8,056,298 | B2 * | 11/2011 | Haugsoen et al. | 52/651.09 |
| 8,418,413 | B2 * | 4/2013 | Marmo et al. | 52/167.4 |
| 8,439,166 | B2 * | 5/2013 | Kreller | 182/178.1 |
| 8,458,963 | B2 * | 6/2013 | Foss et al. | 52/40 |
| 8,607,508 | B2 * | 12/2013 | Foss | 52/40 |
| 2008/0028715 | A1 * | 2/2008 | Foss et al. | 52/651.01 |
| 2008/0290245 | A1 * | 11/2008 | Haugsoen et al. | 248/673 |
| 2010/0226785 | A1 * | 9/2010 | Livingston et al. | 416/244 R |
| 2011/0056151 | A1 * | 3/2011 | Marmo et al. | 52/167.4 |

(Continued)

FOREIGN PATENT DOCUMENTS

| | | |
|---|---|---|
| EP | 2290237 | 3/2011 |
| NO | 328411 | 2/2010 |

(Continued)

*Primary Examiner* — Andrew J Triggs
(74) *Attorney, Agent, or Firm* — Patents+TMS, P.C.

(57) ABSTRACT

A transition element between a jacket having four legs and a tower where the lower portion of the tower is fixed to a torsion plate that is connected to an upper portion of the legs. A brace extends from each leg. Each brace includes a strut. The strut has a first end portion and a second end portion. The strut is fixed to the upper portion of each leg and a plate that is fixed to the tower at a contact portion above the torsion plate. The planar plate is fixed to the tower in the circumferential direction and has a common axis of symmetry with the strut. The plate is fixed to the first end portion of the strut.

12 Claims, 7 Drawing Sheets

(56) References Cited

U.S. PATENT DOCUMENTS

| | | | |
|---|---|---|---|
| 2011/0101184 A1* | 5/2011 | Kirby et al. | 248/218.4 |
| 2011/0138721 A1* | 6/2011 | Bagepalli et al. | 52/299 |
| 2011/0146192 A1* | 6/2011 | Foss | 52/651.01 |
| 2014/0075864 A1* | 3/2014 | Foss | 52/223.4 |

FOREIGN PATENT DOCUMENTS

| | | |
|---|---|---|
| NO | 330373 | 4/2011 |
| WO | WO 2006/004417 A1 | 1/2006 |
| WO | WO 2009/157775 A1 | 12/2009 |

* cited by examiner

TRANSITION ELEMENT FOR CONNECTING A TOWER TO A JACKET

BACKGROUND OF THE INVENTION

There is provided a transition element for connecting a tower to a jacket. More precisely there is provided a transition element between a jacket having four legs and a tower where the lower portion of the tower is fixed to a torsion plate that is connected to the upper portion of the legs, and a brace extending from each leg where each brace includes a strut that is fixed to the upper portion of the leg and a plate that is fixed to the tower at a contact portion above the torsion plate.

The device is below illustrated by means of a supporting tower structure of a windmill, a structure of this kind adequately showing the challenges addressed by the invention. The invention is not limited to a tower for windmills, but can be used in a number of structures, in which similar force patterns exist.

To avoid collision with blades of the windmill, the upper portion of a windmill tower must be formed as a slim structure. From land-based windmills it is known that this slim structure, which is often in the form of a pipe, is connected to a base in the ground.

When windmills are placed off shore and mare often in relatively deep water, it is not practical to use one pipe extending from the base of the windmill and up to the nacelle of the windmill.

Therefore, the supporting tower structure of known windmills that are placed off shore, often has a tubular upper tower portion and a lower portion, in which the lower portion may be in the form of a jacket.

The transition element between the upper slim tower portion and the lower jacket is often formed by a relatively heavy and complicated structure. The reason is, among other things, that construction principles that are known from sea-based oil recovery equipment are applied. Such equipment is dimensioned for considerable wave forces and for handling heavy equipment, and for allowing personnel to be present on the structure at all times.

In windmill installations off shore, the design of the structure is normally determined by the wind forces.

Known transition elements have to be adjusted in such a way that the natural period of the tower will be short enough for the windmill concerned. This contributes to a further increase in the weight of the tower.

SUMMARY OF THE INVENTION

The purpose of the invention is to overcome or reduce at least one of the disadvantages of the prior art.

The purpose is achieved according to the invention by the features as disclosed in the description below and in the following patent claims.

There is provided a transition element between a jacket having four legs and a tower where the lower part of the tower is fixed to a torsion plate that is connected to the upper portion of the legs, and a brace extending from each leg where each brace includes a strut, the strut forms a first end portion and a second end portion, the strut is fixed to the upper portion of each leg and a plate that is fixed to the tower at a contact portion above the torsion plate, wherein the plate is plane, the plate is fixed to the tower in the circumferential direction and has a common axis of symmetry with the strut and the plate is fixed to the strut's first end portion.

The plate may be fixed to the strut in two slits extending axially into the strut at the first end portion at diametrical opposite sides. The plates of all braces may together cover at least 40% of the tower's circumference. The plates of all braces may together cover at least 50% of the tower's circumference. The plates of all braces may together cover at least 60% of the tower's circumference. The plates of all braces may together cover at least 70% of the tower's circumference. The plates of all braces may together cover at least 80% of the tower's circumference. The plates of all braces may together cover at least 90% of the tower's circumference.

The tower may comprise an annular embracement. The tower may have enlarged wall thickness at the contact portion.

The braces may be designed to carry all axial force in the tower. Bending moments from the tower may be carried antimetric by the braces in pairs.

The strut's at least one end portion may be provided with two angular cuts forming a pointed end portion.

A plate may be fixed to a top portion of the upper portion, where the top portion may extend above the torsion plate, in the circumferential direction of the top portion and that the plate may have a common axis of symmetry with the strut. The plate may be fixed to the strut in two slits extending axially into the strut at the second end portion at diametrical opposite sides. The strut's second end portion may be provided with two angular cuts forming a pointed end portion.

The strut may be provided with at least one closing plate welded to the strut and the plate. The closing plate may be D-shaped. The strut may be provided with closing plates at both end portions.

The plate may comprise a curved cut out that forms two opposite tongues, the tongues may be positioned in the slits when the plate is in its use position. The plates at both end portions of the strut may comprise a curved cut out.

As the plates may be considered to be membranes, the plates will only carry insignificant amounts of bending moments and the struts will almost entirely receive tension and compressive forces and the force flow in the braces is much simplified compared to known braces.

The force flow is explained in the special part of the description under reference to the drawings.

It is not necessary for the plates to cover the complete circumference of the tower. It is sufficient that the plates of all braces together cover at least 40% of the tower circumference. In an alternative embodiment the plates cover at least 50% of the tower circumference. In a more preferred embodiment the plates cover at least 60% of the tower circumference. In a furthermore alternative embodiment the plates cover at least 70% of the tower circumference. In an even further embodiment the plates cover at least 80% of the tower circumference and in an even further embodiment the plates cover at least 80% of the tower circumference. In the embodiments where the plates cover at least 40% or 50% or 60% of the tower circumference, it may be necessary to provide the tower with an annular enforcement as known in the art. In this way the circular shape of the tower is maintained.

The tower may have an enlarged wall thickness at the contact positions where the plate is fixed to the tower, in order to absorb the forces carried by the braces.

As the torsion plate is not designed to carry vertical forces from the tower, the braces are designed to carry these forces.

The bending moments from the tower are normally carried antimetric by the braces in pairs. See the explanation in the special part of the description.

The transition element according to the invention substantially simplifies the transition structure between the tower and the jacket, also in that a ring stiffener that normally is present at the tower is rendered superfluous.

BRIEF DESCRIPTION OF THE DRAWINGS

Below, an example of a preferred device is explained under reference to the enclosed drawings, where.

DETAILED DESCRIPTION OF THE PRESENT INVENTION

On the drawings the reference numeral 1 denotes a transition element between a tower 2 and a jacket 4 of a wind mill 6. The tower 2 is in the form of a tubular member and the jacket 4 is in the form of a triangulated space frame having four legs 8. In this preferred embodiment the transition element is a welded steel construction.

A horizontal torsion plate 10 is fixed to an upper portion 12 of each of the legs 8. A lower tower portion 14, here in the form of a trunk that is designed to be bolted to the rest of the tower 2, is fixed to the torsion plate 10. Torsion forces from the tower 2 are transferred to the legs 8 through the torsion plate 10.

Braces 16 extend from each of the upper portion 12 and to the tower 2 at a contact portion 18 above the torsion plate 10.

Below, when it is necessary to refer to individual braces 16 a first brace has the reference numeral 16' etc.

Figure 5:
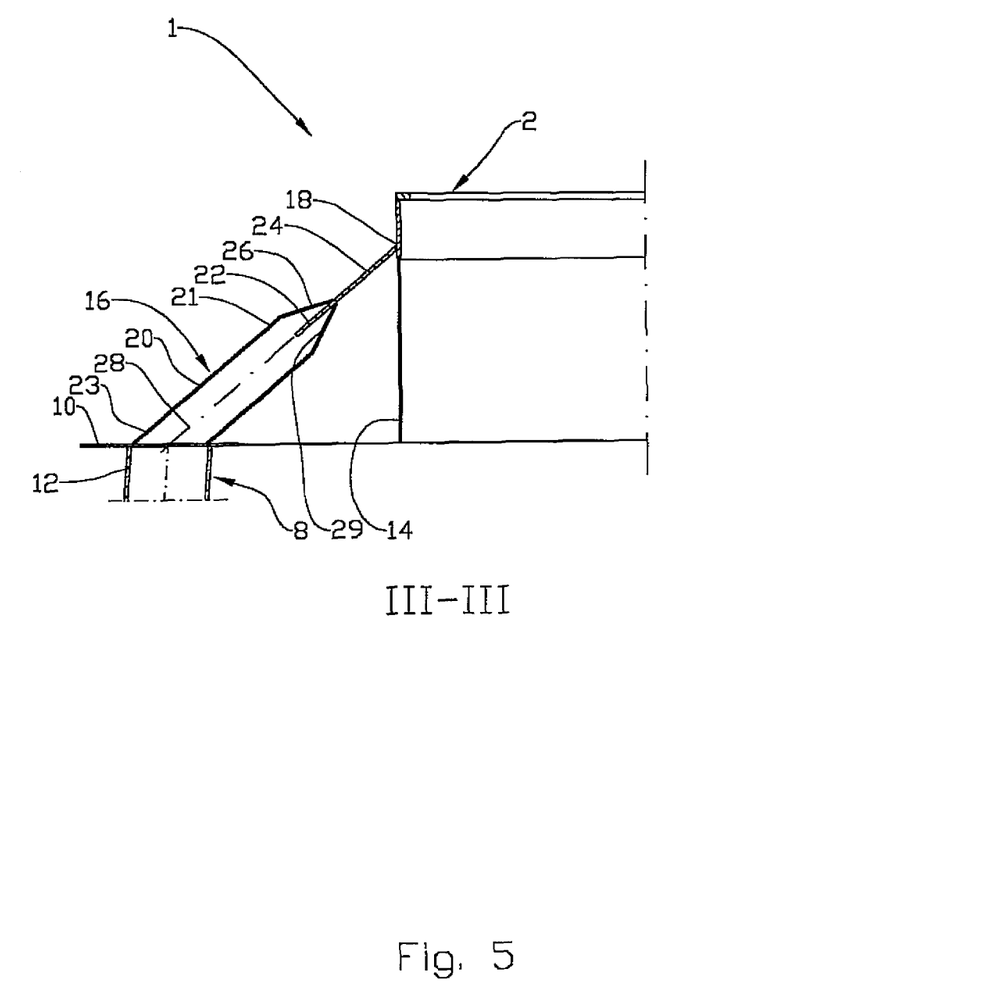
FIG. 5 shows a section in FIG. 3.

Each brace 16 has a tubular strut 20, forming a first end portion 21 and a second end portion 23, the second end portion 23 is connected to the upper portion 12 of the corresponding leg 8. At its first end portion 21 the tubular strut has two slits 22 extending axially into the strut 20 at diametrical opposite sides, see FIG. 5. A plate 24 is inserted in the slits 22 and welded to the strut 20. The strut 20 has welded on D-shaped closing plates 26 that also are welded to the plate 24. The D-shaped closing plate 26 will distribute forces along the circumference of the strut 20 to the plate 24.

The struts 20 are shown with end portions 21 provided with two angular cuts 29 forming pointed end portions 21. This has among other things the advantage that it is possible to position a weld seam between the plate 24 which is positioned in the slits 22 and an inner wall of the strut 20. In addition a welding seam may be positioned between the plate 24 planar surface and the outside surface of the strut 20.

The strut 20 and the plate 24 have a common axis of symmetry 28.

Figure 2:
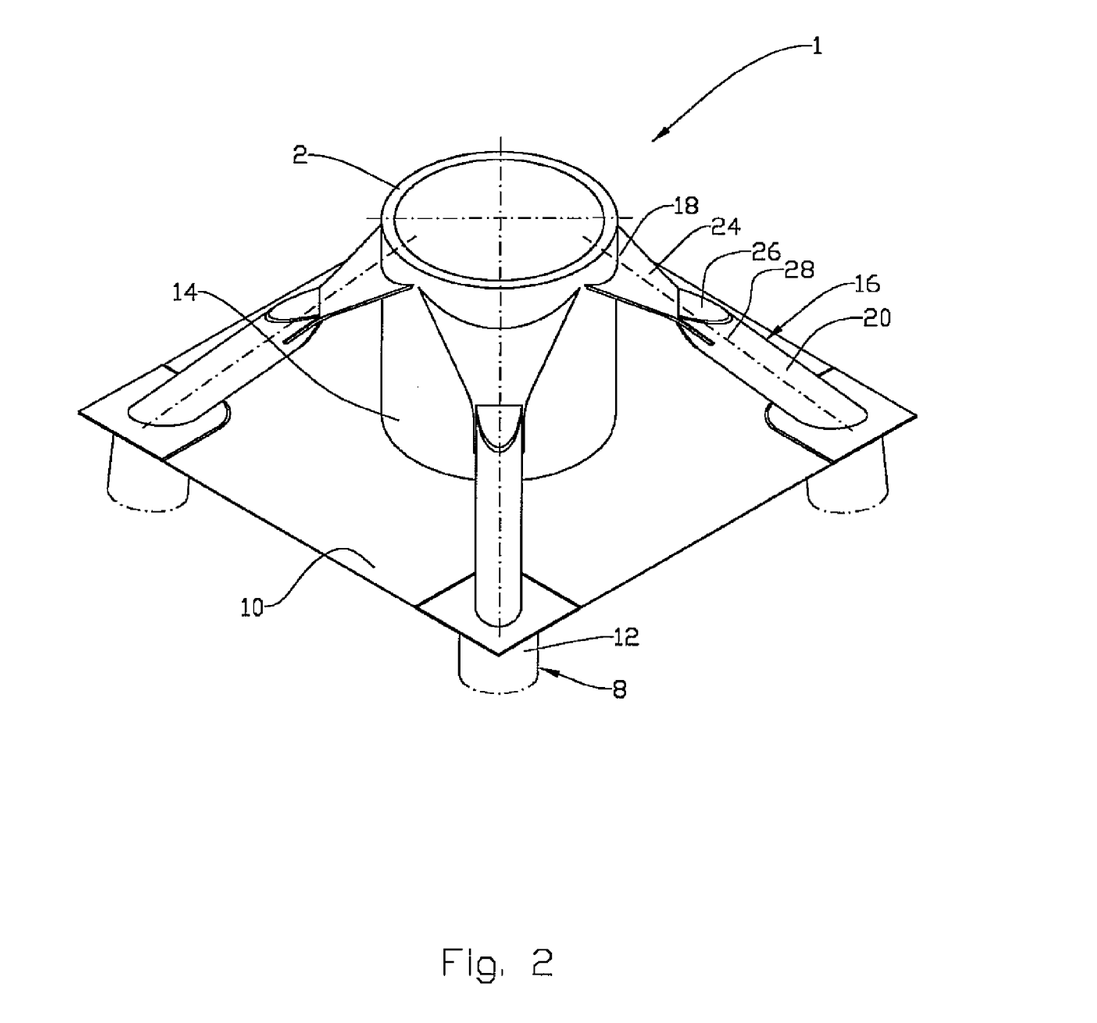
FIG. 2 shows a perspective view of a transition element of the wind mill in FIG. 1.
Figure 4:
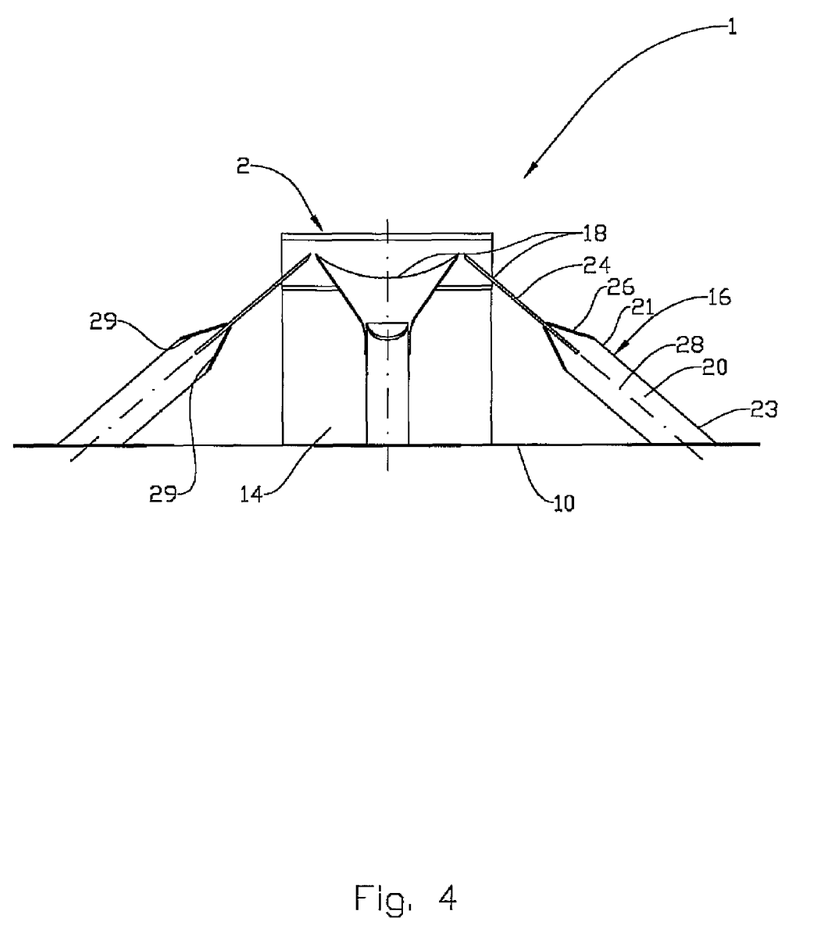
FIG. 4 shows an elevation of the transition element in FIG. 2.

The plate 24 is fixed to the tower 2 in the circumferential direction of the tower 2. As the plate 24 is plane, see FIG. 4, the contact portion 18 between the plate 24 and the tower 2 is following an elliptical path, see FIG. 2.

The plate 24 is wider at the contact portion 18 than at the strut 20.

Figure 1:
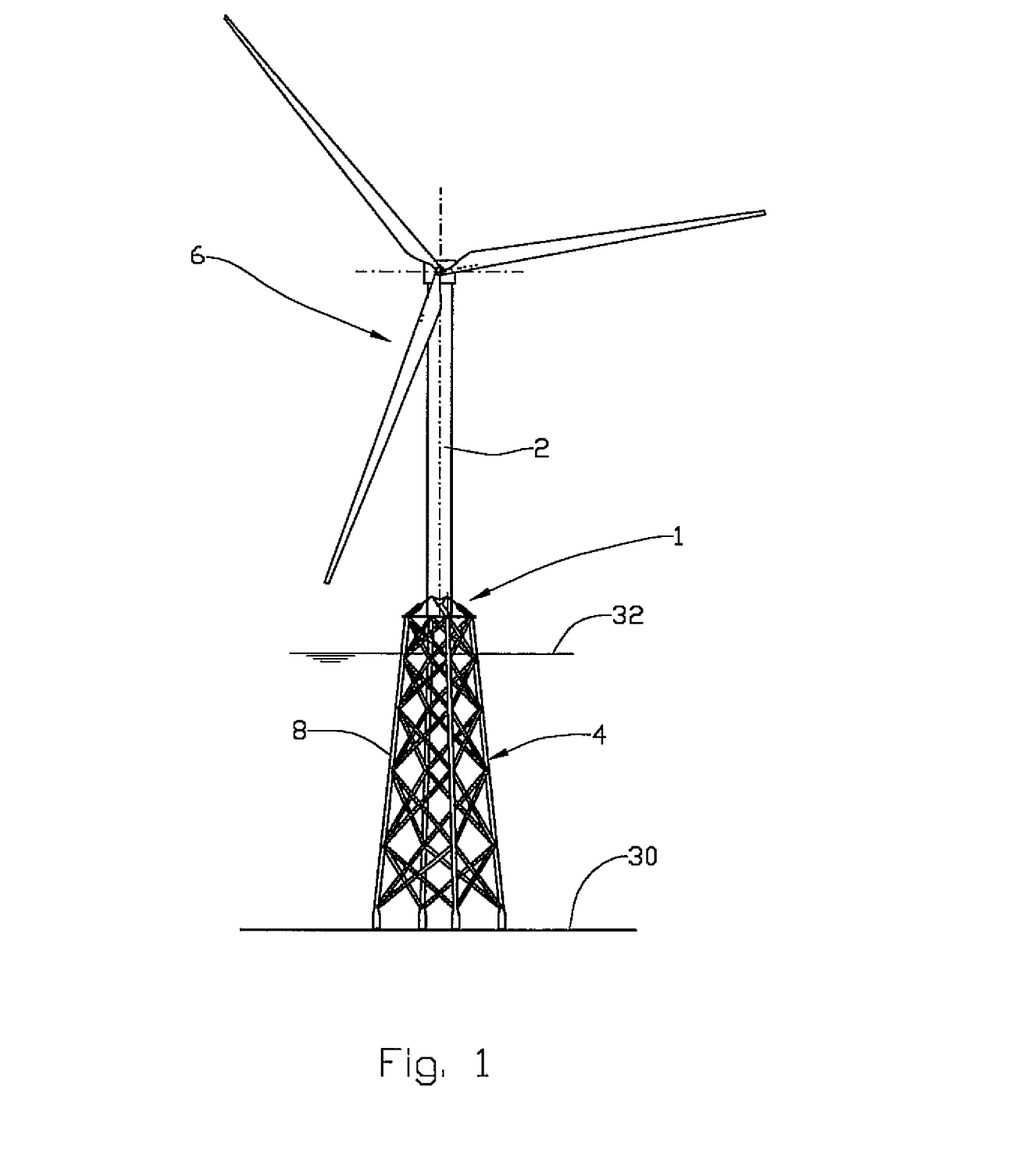
FIG. 1 shows a perspective view of an offshore wind mill.

In FIG. 1 the wind mill 6 is standing on the sea bed 30, while the reference numeral 32 denotes the sea level.

Horizontal thrust forces acting on the tower 2 are setting up a bending moment in the tower 2. The moment is counteracted by a couple between the torsion plate 10 and the contact portion 18. The resultant forces at the contact portion 18 are decomposed to act as tension or compression forces in the braces 16.

Figure 3:
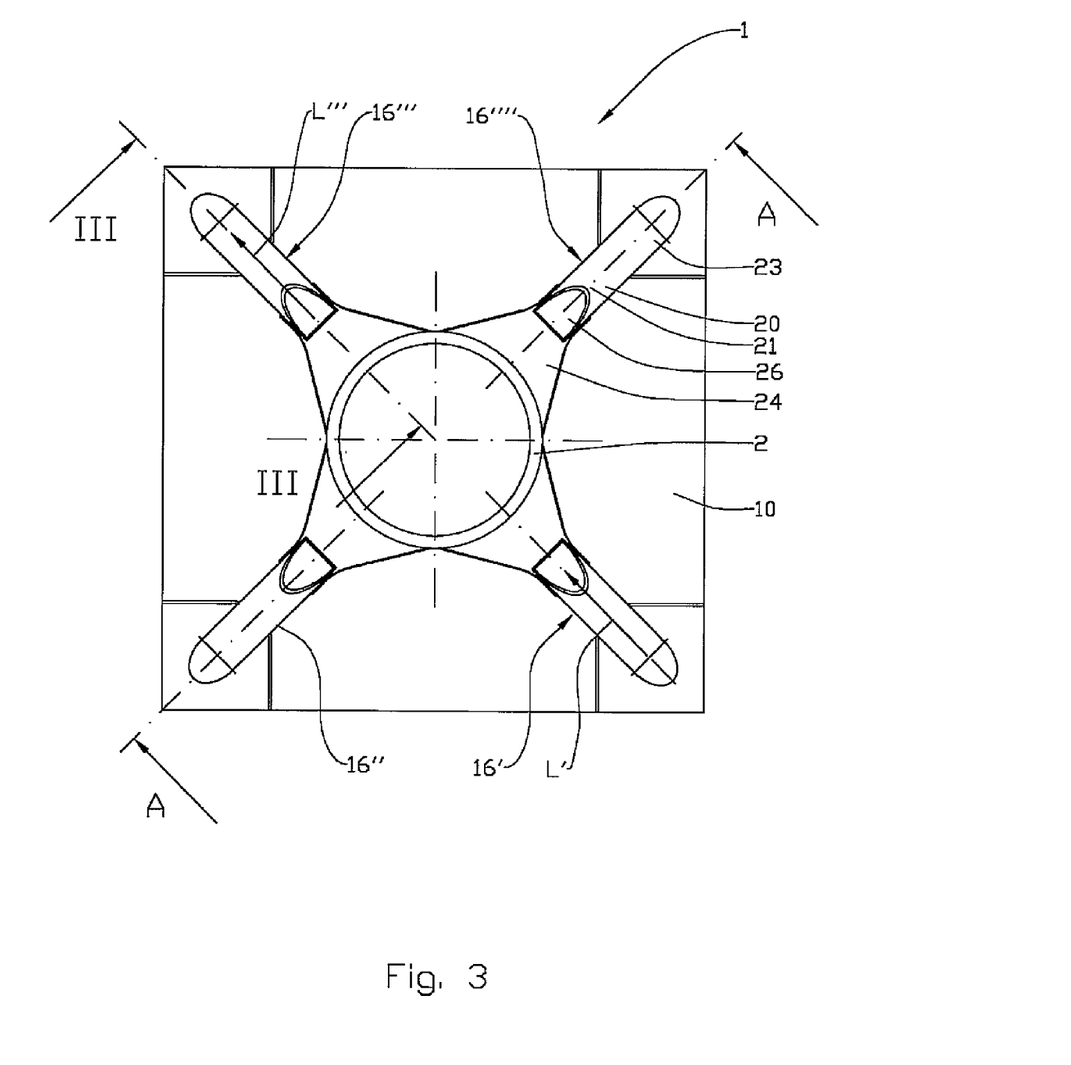
FIG. 3 shows a plane view of the transition element in FIG. 2.

The transition element 1 is symmetrical about a section A-A as shown in FIG. 3. The load L', L''', originating from a horizontal thrust force acting on the tower 2, is thus antimetric. The elements along A-A are completely clamped, i.e. they are unable to move or rotate. Thrust forces are important from a fatigue point of view and a simple and safe way of transferring these from the tower 6 to the jacket 4 is important. The load L' is acting in a first brace 16' and the load L''' is acting in the third brace 16'''.

The braces 16 are almost totally clamped at their end portions near the torsion plate 10 as they are fixed to the corresponding leg 8. The stiffness of the strut 20 is so high that the opposite end portion of the strut 20, at the connection to the plate 24, is basically fixed in space. The membrane stiffness of the plate 24 ensures that the circular shape of the tower 2 is maintained along the contact portion 18.

In the load example given in FIG. 3, said features apply both to the contact portion 18 of the braces 16' and 16''' as well as to the contact portion 18 of the second brace 16'' and the fourth brace 16'''' were the plates 24 and struts 20 are completely clamped along A-A and thus can not rotate. The membrane stiffness of the plates ensures a circular shape of the tower 2 at the contact portion 18.

In this embodiment, the plate 24 is provided with a curved cut out (not shown) in the part extending into the strut 20. The advantage of this cut out is described below.

Figure 6:
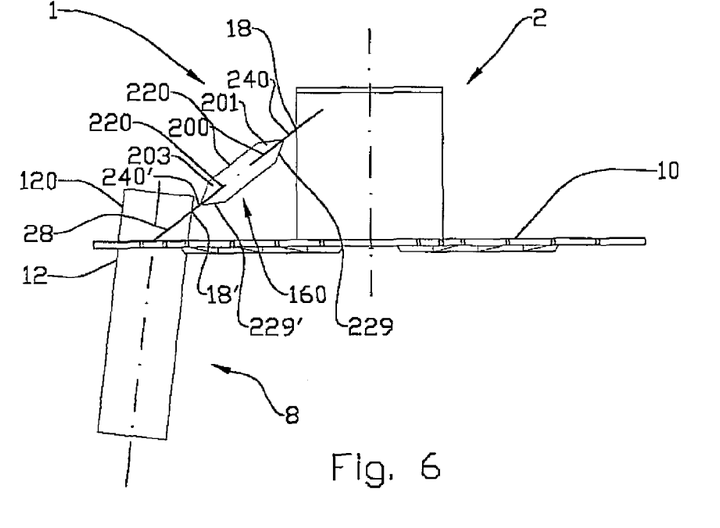
FIG. 6 shows the transition element in a second embodiment.
Figure 7:
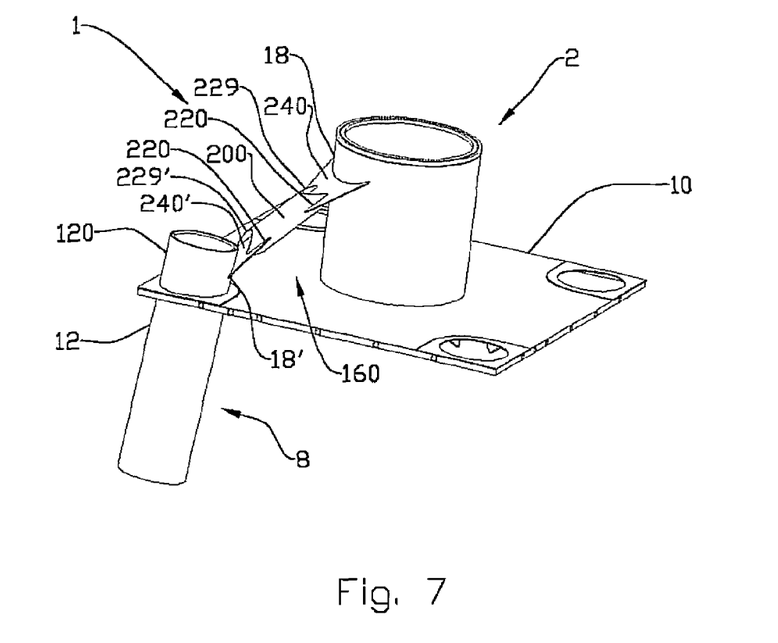
FIG. 7 shows a perspective view of the second embodiment shown in FIG. 6.
Figure 8:
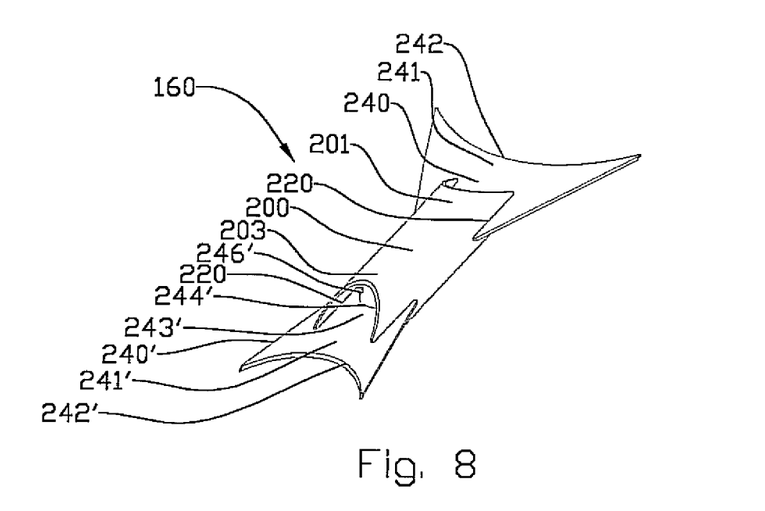
FIG. 8 shows a perspective view of detail of the transition element in a larger scale.

An alternative embodiment is shown in FIGS. 6-8. The upper portion 12 comprises a top portion 120 which extends above the horizontal torsion plate 10. Braces 160 extend from each of the top portions 120 and to the tower 2 at a contact portion 18 above the torsion plate 10. Each brace 160 comprises a tubular strut 200. The strut 200 forms a first end portion 201 and a second end portion 203. Each end portion 201, 203 is provided with two angular cuts 229, 229' forming pointed end portions 201, 203. Each end portion 201, 203 is provided with two silts 220 extending axially into the strut 200 at diametrical opposite sides, see FIGS. 7 and 8. A plate 240 is inserted in the slits 220 and welded to the tubular strut 200 at the first end portion 201 and a plate 240' is inserted in the slits 220 and welded to the tubular strut 200 at the second end portion 203. The strut 200 may have welded on closing plates 26 that also are welded to the plate 240, 240', similar to the embodiment shown in FIGS. 2-4. The closing plate 26 will distribute forces along the circumference of the strut 200 to the plate 240, 240'. The strut 200 and the plate 240, 240' have a common axis of symmetry 28. The pointed end portions 201, 203 have among other things the advantage that it is possible to position a weld seam between the plate 240, 240' positioned in the slits 220 and an inner wall of the strut 200. In addition a welding seam may be positioned between the plate 240, 240' planar surface and the outside surface of the strut 200.

The plate 240 is fixed to the tower 2 in the circumferential direction of the tower 2. As the plate 240 is plane, see FIGS. 6 and 7, the contact portion 18 between the plate 240 and the tower 2 is following an elliptical path, see FIGS. 6 and 7. The plate 240' is fixed to the top portion 120 in the circumferential direction of the top portion 120.

As the plate 240' is plane, see FIGS. 6 and 7, the contact portion 18' between the plate 240' and the top portion 120 is following an elliptical path, see FIGS. 6 and 7.

Figure 9:
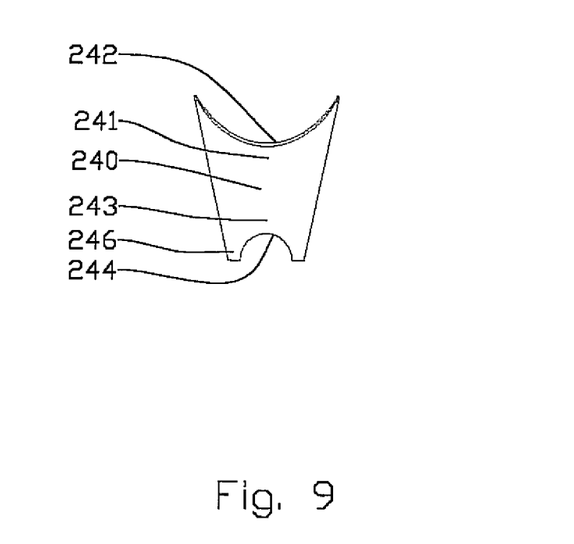
FIG. 9 shows a plane view of a plate in the transition element.

An example of a plate 240 is shown in FIG. 9. The plate 240 forms a first end portion 241 and a second end portion 243. The plate 240 is wider at the first end portion 241 than at the second end portion 243. The overall shape of the plate 240 is determined by the diameter of the tower 2 or the lower tower portion 14, and the diameter of the strut 200. The first end portion 241 is provided with a curved cut out 242 and the second end portion 243 may be provided with a curved cut out 244. The curvature of the cut out 242 is determined by the diameter of the tower 2 or the lower tower portion 14. In the same way, see FIGS. 7 and 8, the plate 240' comprises a first end portion 241' and a second end portion 243'. The plate 240' is wider at the first end portion 241' than at the second end portion 243'. The overall shape of the plate 240' is determined by the diameter of the top portion 120 and the diameter of the strut 200. The first end portion 241' is provided with a curved cut out 242' and the second end portion 243' may be provided with a cut out 244'. The curvature of the cut out 242' is determined by the diameter of the top portion 120.

The curved cut out 244, 244' forms two opposite tongues 246, 246' in the plate 240, 240'. The tongues 246, 246' are positioned in the slits 220 when the plate 240, 240' is in its use position. This has the advantage that the tension forces between the plate 240, 240' and the strut 200 in the slits 220 is better distributed without hot spots along the edges of the plate 240, 240'.

The invention claimed is:

1. A transition element between a jacket and a tower in the form of a tubular member wherein the tubular tower has a lower portion connected to the transition element and the jacket has legs wherein the legs have an upper portion, the transition element comprising:
   a torsion plate connected to the upper portion of the legs wherein the torsion plate is not designed to carry vertical forces from the tubular tower;
   a brace extending from each leg wherein each brace has a tubular strut having a first end portion and a second end portion wherein the second end portion is positioned opposite to the first end portion wherein the second end portion of the tubular strut is connected to the upper portion of each leg wherein the first end portion of the tubular strut has an interior formed by two slits extending axially into the tubular strut and further wherein the braces are designed to carry all axial force in the tubular tower; and
   a plate having a length defined between a first end and a second end wherein the first end is positioned opposite to the second end wherein the first end is connected to the tubular tower at a contact portion above the torsion plate wherein the plate is generally planar and further wherein the plate is connected to the tubular tower in the circumferential direction and the plate has a common axis of symmetry with a longitudinal axis of the tubular strut wherein the second end of the plate inserts into the two slits of the first end Portion and further wherein the second end of the plate is welded to the tubular strut.

2. The transition element of claim 1, wherein the plates of the braces cover at least 40% of the circumference of the tubular tower.

3. The transition element of claim 1, wherein the tubular tower has an enlarged tubular wall thickness at the contact portion between the plate and the tubular tower and further wherein the contact portion is not in direct contact with the torsion plate.

4. The transition element of claim 1, wherein bending moments from the tubular tower are carried antimetric by the braces in pairs.

5. The transition element of claim 1, wherein the first end portion of the tubular strut has two angular cuts forming a pointed first end portion that converges on a plane formed by the two slits of the first end portion.

6. The transition element of claim 1 further comprising:
   a lower plate directly connected to a top portion of the upper portion of the legs in the circumferential direction of the top portion wherein the top portion extends above the torsion plate and further wherein the lower plate has a common axis of symmetry with a longitudinal axis of the tubular strut.

7. The transition element of claim 6, wherein the second end portion of the tubular strut has an interior formed by two slits extending axially into the tubular strut wherein the lower plate inserts into the two slits of the second end portion and further wherein the lower plate is welded to the tubular strut.

8. The transition element of claim 6, wherein the second end portion of the tubular strut has two angular cuts forming a pointed second end portion.

9. The transition element of claim 1, wherein the tubular strut has a closing plate connected to the tubular strut and the plate.

10. The transition element of claim 6, wherein the tubular strut has a D-shaped closing plate connected to the tubular strut and the lower plate.

11. The transition element of claim 1, wherein the plate has a curved cut out that forms two opposite tongues wherein the tongues are positioned in the two slits of the first end portion and the plate is welded to the tubular strut when the plate is connected to the tubular tower.

12. The transition element of claim 7, wherein the lower plate has a curved cut out that forms two opposite tongues wherein the tongues are positioned in the two slits of the second end portion and the plate is welded to the tubular strut when the plate is connected to the top portion of the upper portion of the leg.

* * * * *